United States Patent
Meier et al.

(10) Patent No.: US 8,374,113 B2
(45) Date of Patent: Feb. 12, 2013

(54) DISTRIBUTED GATEWAY FOR RELIABLE MULTICAST WIRELESS VIDEO

(75) Inventors: Robert C. Meier, Cuyahoga Falls, OH (US); Neil R. Diener, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 12/792,871

(22) Filed: Jun. 3, 2010

(65) Prior Publication Data

US 2011/0299448 A1 Dec. 8, 2011

(51) Int. Cl.
H04W 40/00 (2009.01)
(52) U.S. Cl. ........................................ 370/312; 370/338
(58) Field of Classification Search .................. 370/312, 370/390, 432, 465, 466, 338
See application file for complete search history.

(56) References Cited

U.S. PATENT DOCUMENTS

| | | | |
|---|---|---|---|
| 7,170,938 B1 | 1/2007 | Cote et al. | |
| 7,190,723 B2 | 3/2007 | Schoenblum | |
| 7,236,521 B2 | 6/2007 | Schoenblum | |
| 7,301,946 B2 | 11/2007 | Meier et al. | |
| 7,362,776 B2 | 4/2008 | Meier et al. | |
| 2005/0007956 A1* | 1/2005 | Nilsson et al. | 370/232 |
| 2005/0254575 A1* | 11/2005 | Hannuksela et al. | 375/240.1 |
| 2006/0013300 A1* | 1/2006 | Han | 375/240.03 |
| 2006/0098596 A1* | 5/2006 | Park et al. | 370/329 |
| 2006/0153117 A1* | 7/2006 | Bichot et al. | 370/316 |
| 2007/0153712 A1 | 7/2007 | Frye et al. | |
| 2007/0156924 A1 | 7/2007 | Ramalingam et al. | |
| 2010/0020878 A1 | 1/2010 | Liang et al. | |
| 2010/0046634 A1* | 2/2010 | Dai et al. | 375/240.25 |
| 2010/0188989 A1 | 7/2010 | Wing et al. | |
| 2010/0208825 A1* | 8/2010 | Chou et al. | 375/240.23 |
| 2010/0226262 A1* | 9/2010 | Liu et al. | 370/252 |
| 2010/0260259 A1* | 10/2010 | Kimmich et al. | 375/240.07 |
| 2010/0263012 A1* | 10/2010 | Huang et al. | 725/116 |
| 2011/0032999 A1* | 2/2011 | Chen et al. | 375/240.26 |

* cited by examiner

Primary Examiner — Brian D Nguyen
(74) Attorney, Agent, or Firm — Edell, Shapiro & Finnan, LLC

(57) ABSTRACT

Techniques are provided to reduce or restrict the bandwidth consumed by multicast video streams on wireless links, such as wireless IEEE 802.11 links. At a central multicast video transcoder apparatus configured to communicate with one or more access point devices operating in a wireless local area network, one or more multicast video streams are re-encoded the one or more multicast video streams to produce a corresponding one or more wireless-friendly multicast video streams that have a reduced bandwidth from a bandwidth of the received multicast video streams. The one or more wireless-friendly multicast video streams are thus adapted for wireless transmission by access point devices to wireless client devices in the wireless local area network. The one or more access point devices receive the one or more wireless-friendly multicast video streams and process the one or more wireless-friendly multicast video streams depending on conditions in a radio channel used by the access point device. The access point devices then wirelessly transmit the one or more wireless-friendly multicast video streams to one or more client devices in a corresponding multicast group.

24 Claims, 9 Drawing Sheets

US 8,374,113 B2

DISTRIBUTED GATEWAY FOR RELIABLE MULTICAST WIRELESS VIDEO

TECHNICAL FIELD

The present disclosure relates to wireless local area networks and more particularly to delivering multicast wireless video in wireless local area networks.

BACKGROUND

For some video applications, a video stream needs to be transmitted to multiple endpoint devices simultaneously. Such a video stream is referred to as a "multicast" stream and the devices that are to receive the stream are part of a multicast group. Sending multicast video in a wireless network, such as an IEEE 802.11 wireless local area network (WLAN), presents certain challenges.

The bandwidth allocated for multicast transmissions on an IEEE 802.11 radio link is a fraction (i.e., 2%) of the bandwidth allocated for multicast transmissions on a wired Gigabit Ethernet link, for example. Multicast frames are sent at a "basic rate" on IEEE 802.11 radio links. For example, the highest basic rate for an IEEE 802.11a/b/g/n access point (AP) is typically 24 Mbps. The available bandwidth of an 802.11 link can be highly variable, primarily due to overlap contention.

In an enterprise network, a single multicast video stream may be destined to diverse computer platforms that are connected both via high-bandwidth wired Ethernet links and relatively low-bandwidth wireless IEEE 802.11 links. For example, the same multicast Internet Protocol TV (IPTV) stream may be received by a wired Ethernet High Definition TV (HDTV) monitor and a wireless IEEE 802.11 hand-held device.

The frame error rate on 802.11 wireless links is orders of magnitude higher than the frame error rate on wired Ethernet links. Multicast frames are unacknowledged on 802.11 links. Therefore, a relatively high percentage of multicast frames are lost on 802.11 wireless links. Most video encoding standards are susceptible to frame loss, and they do not facilitate software-based transcoding.

DESCRIPTION OF EXAMPLE EMBODIMENTS

Overview

Techniques are provided to reduce or restrict the bandwidth consumed by multicast video streams on wireless links, such as wireless IEEE 802.11 links. These techniques allow a wireless client device to recover lost multicast video frames on error-prone wireless links. At a central multicast video transcoder apparatus configured to communicate with one or more access point devices operating in a wireless local area network, one or more multicast video streams are received. Each multicast video stream is intended for a multicast group of wireless client devices served by one or more of the access point devices. The multicast video transcoder re-encodes the one or more multicast video streams to produce a corresponding one or more wireless-friendly multicast video streams that have a reduced bandwidth from a bandwidth of the received multicast video streams. The one or more wireless-friendly multicast video streams are thus adapted for wireless transmission by access point devices to wireless client devices in the wireless local area network. The multicast video transcoder sends the one or more wireless-friendly multicast video streams to the one or more access point devices. The one or more access point devices receive the one or more wireless-friendly multicast video streams and process the one or more wireless-friendly multicast video streams depending on conditions in a radio channel used by the access point device. The access point devices then wirelessly transmit the one or more wireless-friendly multicast video streams to one or more client devices in a corresponding multicast group.

Example Embodiments

Figure 1:
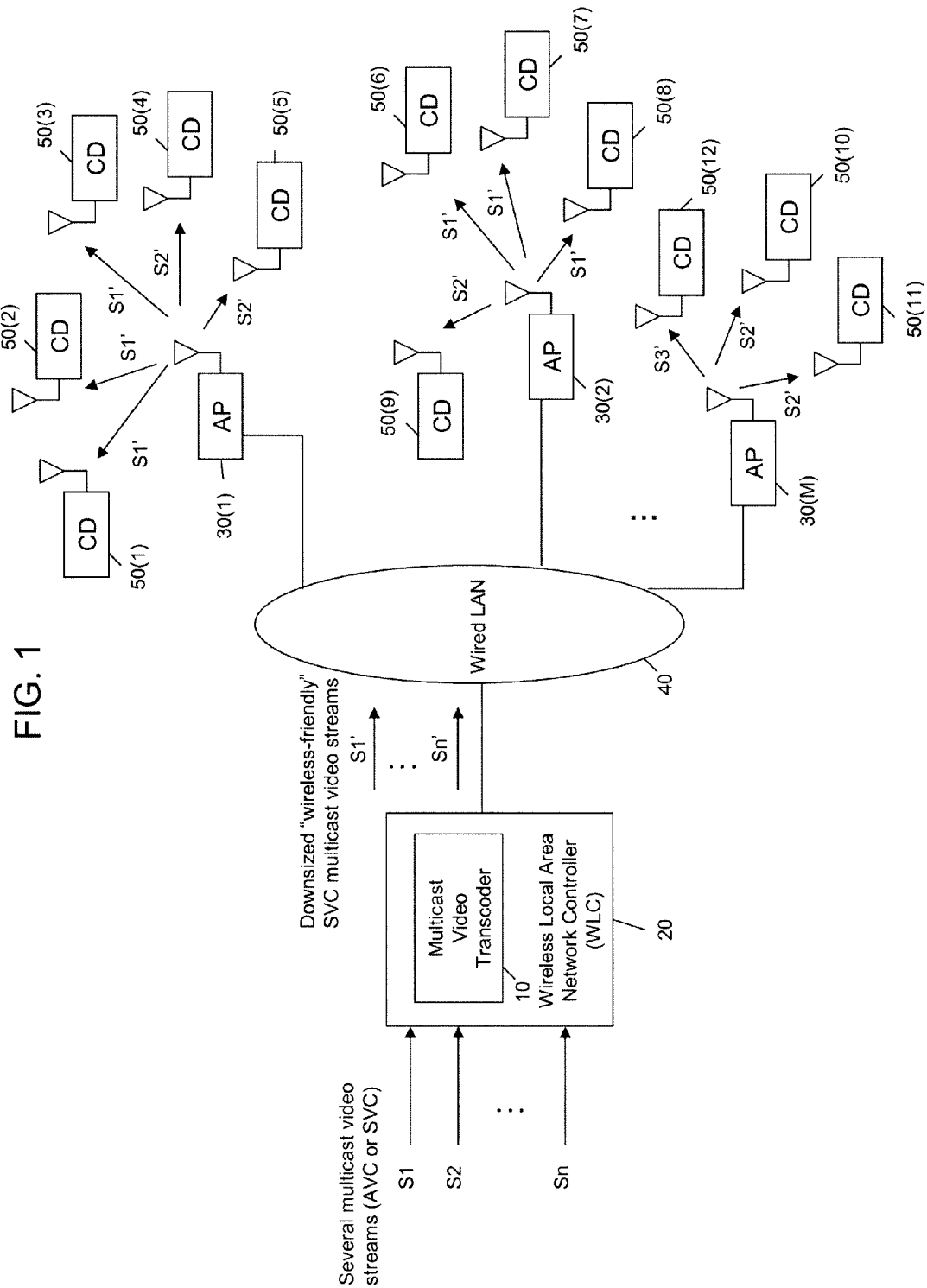
FIG. 1 is an example of a block diagram of a distributed gateway platform for reliable multicast video transmission in a wireless network.
Figure 2:
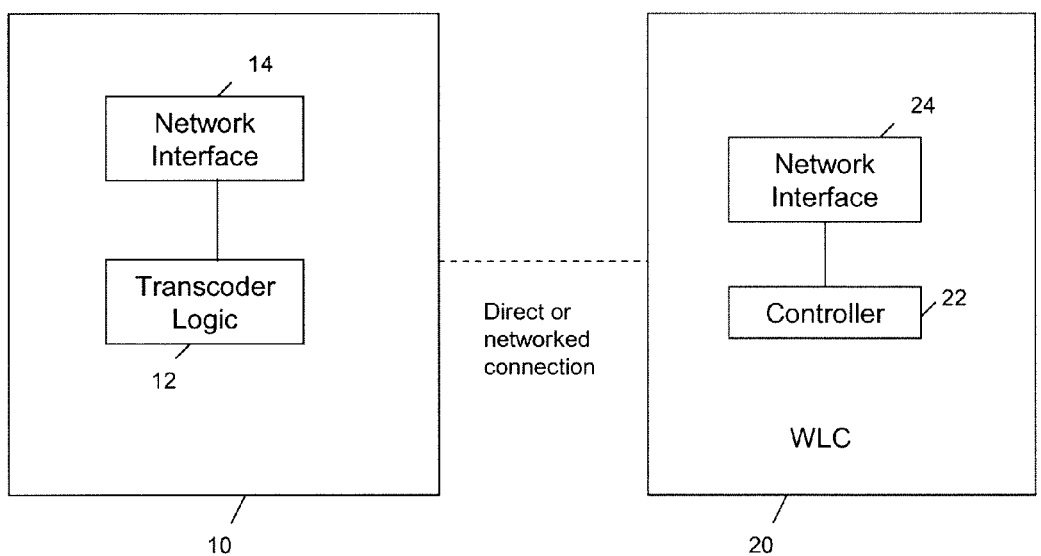
FIG. 2 is an example of a block diagram of a multicast video transcoder that forms a part of the distributed gateway platform and a wireless local area network controller.

Referring first to FIG. 1, a distributed gateway platform for reliably delivering multicast wireless video streams is provided. The distributed gateway platform consists of a central multicast video transcoder 10, which may reside in or otherwise be local to, a wireless local area network (WLAN) controller (WLC) 20, and one or more wireless access points (APs) 30(1)-30(M) each of which being configured to cooperate with the multicast video transcoder 10 in delivering wireless-friendly multicast video streams to endpoint devices shown in FIG. 1 as wireless client devices (CDs) 50(1)-50(12). The multicast video transcoder 10 communicates with the APs 30(1)-30(M) via a wired local area network (LAN) shown at 40. While FIG. 1 shows that the multicast video transcoder 10 is integrated with the WLC 20, this is only an example. They may be separate from each other as shown in FIG. 2.

The APs 30(1)-30(M) and the CDs 50(1)-20(12) are configured to perform wireless communication according to a wireless network communication protocol such as the IEEE 802.11 communication protocol, known commercially as WiFi™. The CDs are also referred to herein as "stations" or "STAs".

As will become more apparent from the following description, the multicast video transcoder 10 is a hardware-based video traffic transcoder that re-encodes (transcodes) downstream multicast video streams into "wireless-friendly" video streams. The WLC 20 tunnels the wireless-friendly multicast video streams to the APs 30(1)-30(M). The APs 30(1)-30(M) transform the video streams, using software, to match the available wireless radio bandwidth and client capabilities.

Examples of types of encoded video formats are described herein for purposes of describing the techniques herein, but this is meant to be by way of example only.

H.264 Advanced Video Compression (AVC)

The H.264 AVC standard is an example of a first encoding format. It is a block-oriented motion-compensation-based codec standard, and is becoming the pervasive standard for video stream encoding. A single high-quality multicast H.264 AVC-encoded IPTV stream, for example, may consume over 10 megabits of bandwidth.

The quality of an H.264 AVC-encoded video stream is degraded by even a low rate of packet loss (i.e. 5%). The loss rate for multicast frames on 802.11 wireless links is generally too high to facilitate H.264 AVC-encoded multicast streams. Furthermore, it is not practical to downsize an H.264 AVC-encoded stream, in software in network devices, such as APs.

H.264 Scalable Video Coding (SVC)

SVC-encoded video is an example of a second video encoding format. Scalable video coding involves encoding a high-quality video bitstream that contains one or more subset bitstreams that can themselves be decoded with a complexity and reconstruction quality similar to that achieved using H.264 AVC with the same quantity of data as in the subset bitstream. The subset bitstream is derived by dropping packets from the larger bitstream. A subset bitstream can represent a lower spatial or temporal resolution or a lower quality video signal (each separately or in combination) compared to the bitstream it is derived from.

The original H.264 AVC standard does not address the diverse quality/bandwidth requirements for a single video stream. For example, an H.264-AVC-encoded multicast video stream cannot easily be re-encoded, by a network device, to match the available bandwidth on 802.11 links.

The SVC extension to the original H.264 AVC standard is designed to address variable bandwidth and packet loss problems. An H.264 SVC stream can easily be re-encoded, in software, to match the available network bandwidth. An H.264 SVC stream can tolerate a much higher packet loss rate (i.e. up to 40%).

An H.264 SVC stream comprises an H.264-AVC-compatible "base stream" and additional higher "enhancement layers". The higher enhancement layers are only dependent on lower layers. The "base stream" generally carries enough information for a minimum quality video stream. The base stream is encoded as an AVC stream.

The enhancement layers incrementally increase both the quality and robustness of the video stream. The enhancement layers contain some redundant information so that forward error correction (FEC) can be used to recover lost frames. The frame rate and quality of a single encoded stream can easily be adapted (modified) for a target link (i.e. Ethernet or 802.11) or a target viewer by selectively including or deleting higher enhancement layers.

Thus, AVC-encoded video format is an example of a first encoding format and the SVC-encoded video format is an example of a second encoding format that comprises a base stream encoded in a format compatible with the first encoding format and one or more enhancement layers that incrementally add quality to the video stream and also comprise redundancy information to allow for forward error correction to recover lost frames.

The term "SVC-aware" or "SVC-capable" endpoint or CD refers to an endpoint or CD that has a more flexible scalable video decoding capability, e.g., capable of decoding a SVC-compliant digital video data (the second video encoding format referred to above) and the term "SVC-unaware" endpoint or CD refers to an endpoint or CD that does not have the more flexible scalable video decoding capability, e.g., is not capable of decoding SVC-compliant digital video data, but is otherwise capable of decoding video according to the first video encoding format. SVC-unaware endpoints can decode only the base stream of an SVC video stream. SVC-aware endpoints can process the base stream and the SVC enhancement layers. Thus, the CDs will have different decoding capabilities, e.g., some may be High Definition video devices and others may be lower definition devices, e.g., hand-held devices, etc.

Generally, the distributed gateway platform involves the multicast video transcoder 10 receiving one or more multicast video streams S1, S2, . . . , Sn in any format, e.g., AVC or SVC format, and converting or modifying those streams to produce downsized wireless-friendly multicast video streams S1', S2', . . . , Sn' in a scalable video format, such as an SVC format. The APs 30(1)-30(M) receive the wireless-friendly multicast video streams S1', S2', . . . , Sn'. The APs 30(1)-30(M) wirelessly transmit a wireless-friendly multicast video stream to the appropriate multicast group member CDs after processing (modification or "shaping") of the video stream as explained further hereinafter. For example, AP 30(1) transmits wireless-friendly multicast video stream S1' to CDs 50(1), 50(2) and 50(3) which are members of a first multicast group intended for multicast video stream S1 and transmits wireless-friendly multicast video stream S2' to CDs 50(4) and 50(5) which are members of a second multicast group intended for multicast video stream S2. Similarly, AP 30(2) transmits wireless-friendly multicast video stream S1' to CDs 50(6), 50(7) and 50(8) which are part of the first multicast group and transmits wireless-friendly multicast video stream S2' to CD 50(9) which is part of the second multicast group. AP 30(M) transmits wireless-friendly multicast video stream S2' to CDs 50(10) and 50(11) which are part of the second multicast group and transmits wireless-friendly multicast video stream S3' to CD 50(2) which is part of a third multicast group. Moreover, each AP separately shapes a given wireless-friendly multicast video stream before transmitting it to the destination CDs of the corresponding multicast group. Thus, the multicast video transcoder 10 and the APs work together to adapt the multicast video streams to make them more suitable for transmission over a wireless network to multicast group member CDs. The AP may shape a wireless-friendly multicast video stream for reasons that include the following. The AP may include or exclude SVC enhancement layers to adapt the bandwidth of a wireless-friendly multicast video stream to the current available bandwidth on the target radio channel. The radio channel used by each AP with its respective CDs will likely behave differently. The AP may include or exclude an SVC enhancement layer, which contains redundant information used for forward error correction, based on the error rate of the target radio channel. The AP may include or exclude an SVC enhancement layer based on the video quality requirements of CDs in the target multicast group.

Reference is now made to FIG. 2 for a description of the WLC 20 and the co-located multicast video transcoder 10. The multicast video transcoder 10 comprises a transcoder logic block 12 and a network interface unit (e.g., Ethernet card) 14. The transcoder logic block 12 is, for example, one or more application specific integrated circuits (ASICs) consisting of digital logic gates configured to perform the re-encoding (transcoding) operations described herein. In another form, the functions of the transcoder logic block 12 are performed by one or computer processors that execute instructions stored in memory, i.e., software. The network interface unit 14 is configured to enable communications over a network and to receive incoming multicast video streams (shown at S1-Sn in FIG. 1). The operations of the multicast video transcoder 10 are described in more detail hereinafter in connection with FIGS. 4 and 5.

The WLC 20 comprises a WLC controller 22 and a network interface 24. The WLC controller 22 is a microprocessor, microcontroller, or other data processing device that executes control algorithms for a WLAN based on software or firmware instructions stored in a memory. The network interface 24 enables two-way communications with the APs 30(1)-30(M) and also communications with the multicast video transcoder 10. As explained further hereinafter, the WLC 20 tunnels the SVC-encoded wireless-friendly multicast video streams to the APs 30(1)-30(M) over one or more IP multicast tunnels via the network 40 (FIG. 1) to the APs 30(1)-30(M). IP tunneling "hides" the wireless-friendly streams from any Ethernet multicast receivers on the Ethernet paths from the WLC 30 to the APs 30(1)-30(M).

Figure 3:
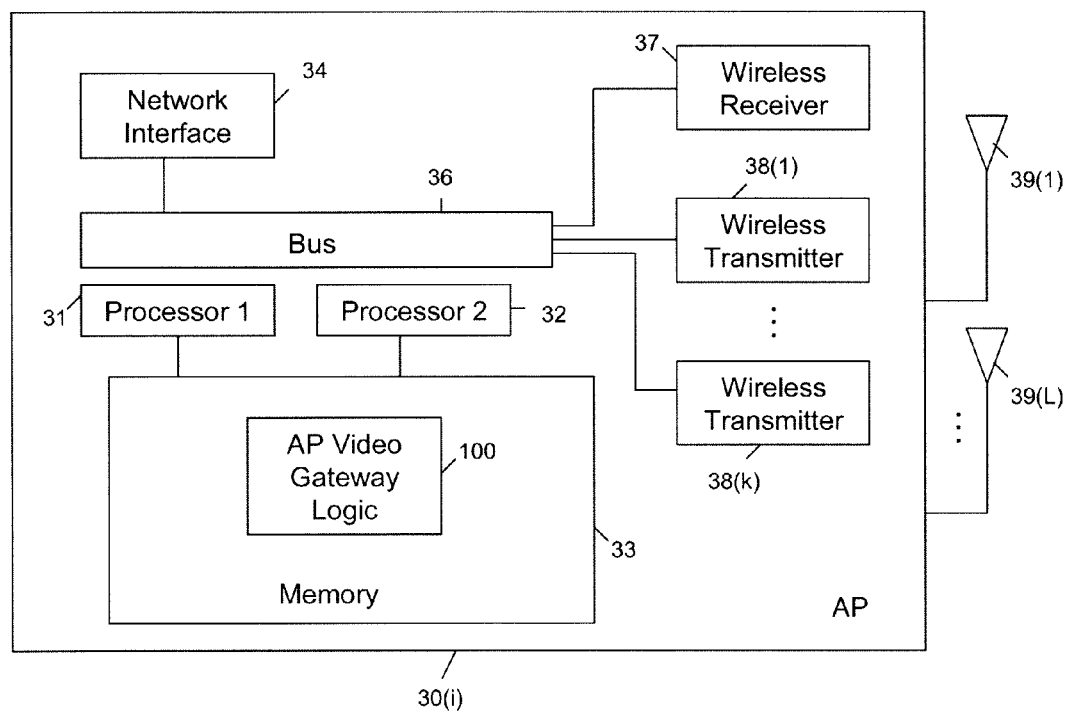
FIG. 3 is an example of a block diagram of a wireless network access point device forming a part of the distributed gateway platform.

Turning now to FIG. 3, an example block diagram is described of an AP 30(i) (as representative of any of the APs 30(1)-30(M), that is configured to perform the AP video gateway processing described herein. The AP comprises two processors 31 and 32, memory 33, a network interface unit 34, a bus 36, a wireless receiver 37 and a plurality of wireless transmitters 38(1)-38(K) and one or more antennas 39(1)-39(L). The processors 31 and 32 may, in one form, be part of a dual-core System-On-Chip (SOC). The memory 33 stores instructions that, when executed by the processors 31 and 32, cause respective ones of the processors 31 and 32 to perform various AP functions. In particular, the memory 33 stores instructions for AP video gateway logic 100. The AP video gateway logic 100, when executed by processor 32 for example, causes the processor 32 to perform the AP video gateway operations described in further detail hereinafter in connection with FIG. 6-9. It is also possible that the operations of one or both of the processors 31 and 32 are implemented in hardware (e.g., in digital logic gates) or in firmware (programmable digital logic gates). The network interface 14 enables wired network communications over the network 40 (FIG. 1) to communicate with the WLC 30.

The wireless receiver 37 and wireless transmitters 38(1)-38(K) are configured to enable wireless communications with CDs served by the AP according to a wireless communication protocol, such as the IEEE 802.11 family of communication protocols. One of the processors, e.g., processor 31, is configured to perform the baseband modulation and demodulation of signals according to the wireless communication protocol employed by the AP. The AP may be configured with multiple wireless transmitters 38(1)-38(K) in order to serve multiple downlink radio channels simultaneously, each of which may carry the same or different wireless multicast video streams.

Figure 4:
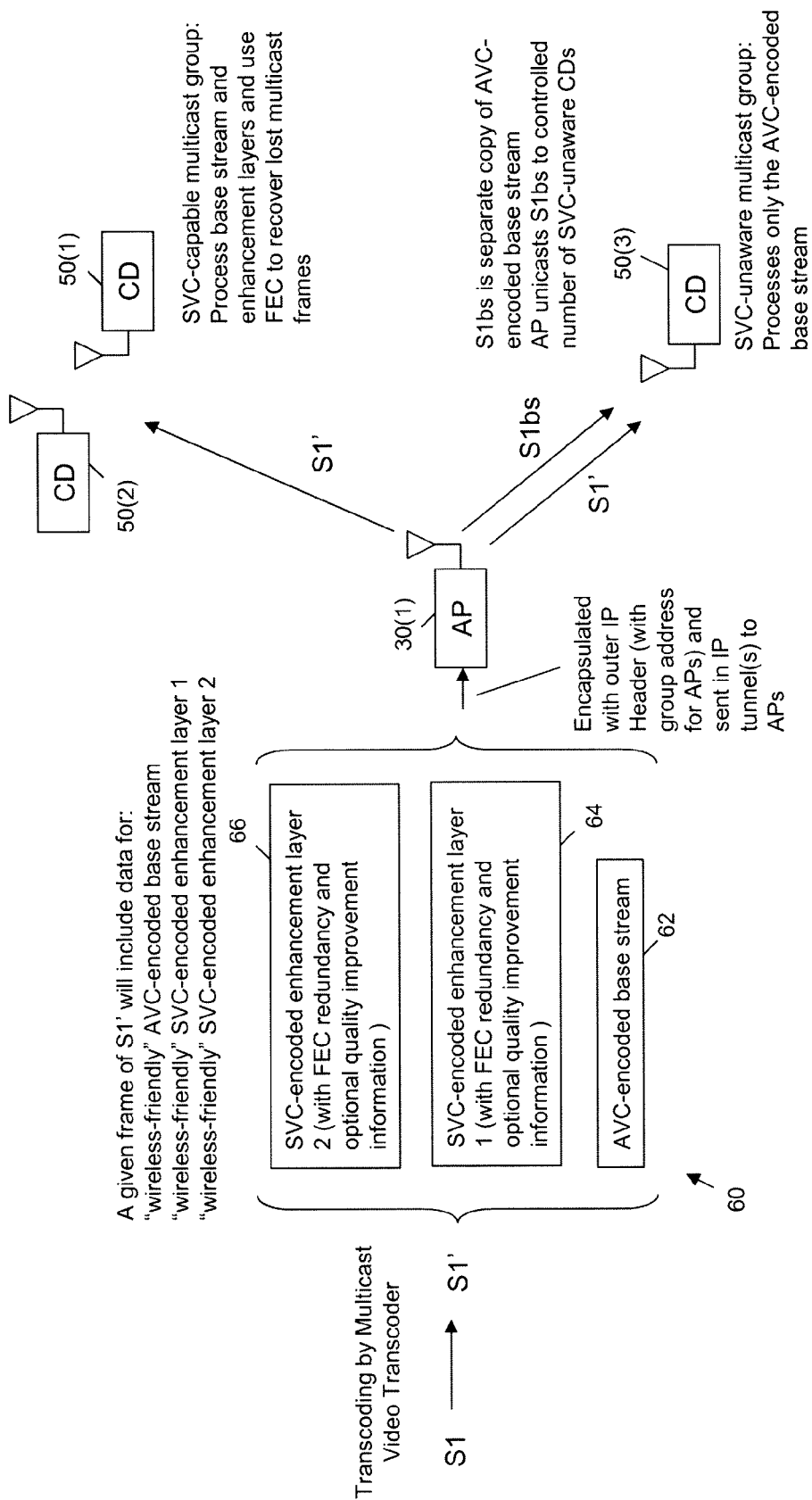
FIG. 4 is an example of a flow diagram generally depicting operations of the distributed gateway platform.

Reference is now made to FIG. 4 for a high level description of the operations of the distributed gateway platform. The multicast video transcoder 10 is, in one form, a hardware-based apparatus (though a software implementation is possible), and receives one or more multicast video streams that are destined for a multicast group of wireless endpoints. The video streams may comprise video encoded in any variety of resolution formats, such as H.264 AVC or SVC encoded multicast video. The multicast video transcoder 10 re-encodes each video stream, e.g., video stream S1, to produce a wireless-friendly multicast scalable-encoded, e.g., SVC-encoded, video stream S1' that is downsized to match inherent 802.11 bandwidth limitations.

As shown in FIG. 4, a given frame 60 of a wireless-friendly multicast wirelessly SVC-encoded video stream produced by the multicast video transcoder 10 comprises data for: a wireless-friendly AVC-encoded base stream 62, a wireless-friendly SVC-encoded enhancement layer 1 shown at reference numeral 64 and a wireless-friendly SVC-encoded enhancement layer 2 shown at reference numeral 66. The AVC-encoded base stream layer 62 is sized to meet the minimum video quality constraints of CDs.

The SVC enhancement layers 64 and 66 may contain additional FEC redundancy information, not already or otherwise included in an incoming SVC video stream, so that a CD can use FEC techniques to recover lost frames. Multicast frames are not acknowledged on 802.11 wireless links. Therefore, the entire multicast frame is lost if a single bit in the frame is corrupted. Additional redundancy information included in the SVC enhancement layers for FEC allows the SVC-aware CDs to recover corrupted frames and is much more efficient than a method where each multicast frame is transmitted several times. Again, while there may some minimal redundancy in the incoming multicast SVC video stream, this is not enough for transmission over a wireless link and thus additional redundancy (not otherwise included in the multicast video stream prior to re-encoding) is added to one or more of the enhancement layers of the wireless-friendly multicast video stream.

For example, a high-definition multicast IPTV stream may consume 15+ Mbps of bandwidth. The same multicast stream may be received by a large High Definition monitor client device (on a 10 Gbps Ethernet link) or an IPod® client device with a very small display on a wireless 802.11 link. The IPod client device (or any other 802.11 device with a small display) does not need a video stream at 15+ Mbps because it simply cannot display video frames at that high of a resolution on such a small display. Thus, the multicast video transcoder 10 transcodes and downsizes the 15+ Mbps multicast video stream into a more wireless-friendly 2 Mbps multicast video stream, for example. The base AVC stream resulting from the transcoding/re-encoding can be sized so that video quality is acceptable on 802.11 CDs (i.e. with small monitors). The SVC enhancement layers resulting from the transcoding can be used to improve the video quality on SVC-aware CDs, by including additional video resolution data useful to produce a higher resolution video frame when decoded. Also, as explained above, the SVC enhancement layers can also have additional redundancy information for FEC for SVC-aware CDs.

It is expected that most incoming streams will be H.264 AVC (MPEG4) streams. The multicast video transcoder 10 will transcode each AVC stream into a more wireless-friendly H.264 SVC stream that is comprised of a base stream and one or more enhancement layer streams. The base stream is an AVC stream. In most cases, the base stream will be smaller in bandwidth than the original AVC stream. The multicast video transcoder 10 can also transcode other video stream types into a wireless-friendly SVC format as described herein. For example, the multicast video transcoder 10 can transcode an MPEG2 video stream into a wireless-friendly SVC stream.

When the incoming stream is a scalable format video stream, e.g., an SVC stream, the multicast video transcoder 10 transcodes or re-encodes it to reduce its bandwidth (e.g., from 25 Mb down to 4-5 Mb) for the base stream and also to include more FEC redundancy (than is otherwise included in the incoming SVC stream) in the enhancement layers of the transcoded and wireless-friendly multicast SVC video stream. Again, the enhancement layers in the wireless-friendly multicast SVC video stream also provide additional quality information.

After the multicast video transcoder 10 generates the wireless-friendly video frame 60, the WLC 30 encapsulates it (or several such wireless-friendly video frames) with an outer Internet Protocol (IP) header having a group address for the APs 30(1)-30(M) and sends it in one or more IP tunnels to the APs 30(1)-30(M). The IP tunneling of the wireless-friendly multicast video frames hides or in other words prevents them from being received by other devices on the Ethernet path from the WLC to the APs. As explained above in connection with FIG. 3, the wireless-friendly multicast video stream is a wireless-friendly multicast SVC-encoded video stream that comprises the wireless-friendly AVC-encoded base stream layer 62, a first SVC-encoded enhancement layer 64 and a second SVC-encoded enhancement layer 66. FIG. 4 shows that a given AP, e.g., AP 30(1), receives the wireless-friendly SVC-encoded frames and transmits them to all CDs that are members of the multicast group intended by the multicast video stream S1. In this example, there are three intended endpoints for the multicast video stream S1 at AP 30(1): CDs 30(1), 30(2) and 30(3). Also in this example, CDs 30(1) and 30(2) are devices that are SVC-capable or SVC-aware and CD 30(3) is SVC-unaware. The same SVC-encoded frames are sent to all CDs in that multicast group regardless of their decoding capabilities. As a result, SVC-capable CDs 30(1) and 30(2) receive the wireless-friendly SVC-encoded frames and process the base stream and enhancement layers, and use FEC to recover any lost frames. SVC-unaware CD 30(3), on the other hand, processes only the AVC-encoded base stream in the received wireless-friendly SVC-encoded frames. In addition, FIG. 4 shows that the AP 30(1) generates a separate copy of the AVC-encoded base stream for multicast video stream S1' and sends it as a unicast stream to a controlled number of SVC-unaware CDs that it serves, e.g., to CD 30(3). This unicast streaming operation is described further hereinafter.

Figure 5:
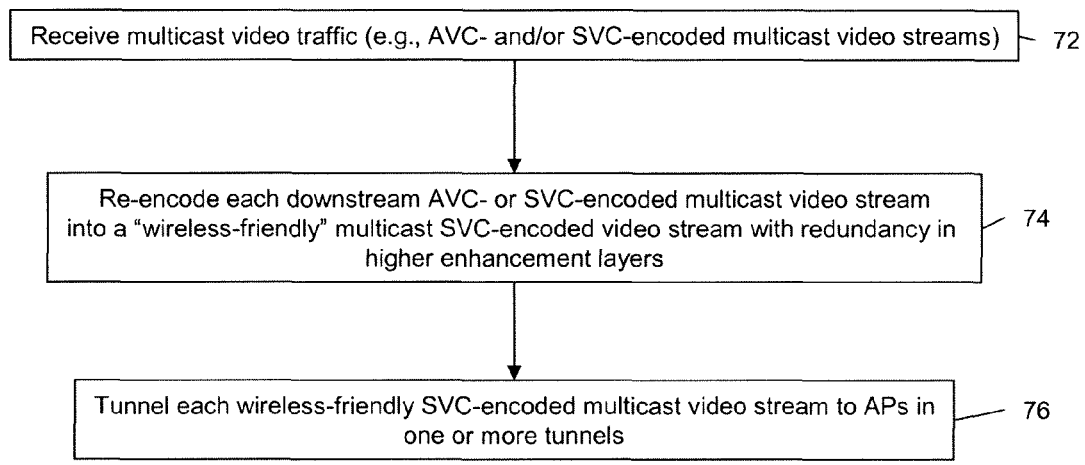
FIG. 5 is an example of a flow chart depicting operations at the multicast video transcoder.

Reference is now made to FIG. 5 for a description of the re-encoding and transmission operations, shown generally at reference numeral 70, that are performed by the multicast video transcoder 10 and the WLC 20. At 72, multicast video traffic (e.g., AVC- or SVC-encoded multicast video streams) is received at the multicast video transcoder. At 74, the multicast video transcoder 10 re-encodes each AVC- or SVC-encoded multicast video stream to produce a wireless-friendly multicast SVC-encoded video stream (as described above in connection with FIG. 4) such that the wireless-friendly or modified multicast video streams have a reduced bandwidth (reduced from a bandwidth of the received multicast video streams) that is more suitable for wireless transmission by the APs to the CDs in the WLAN. In more general terms, the re-encoding operation 74 involves re-encoding a multicast video stream according to either a first encoding format or a second encoding format into a corresponding wireless-friendly multicast video stream comprising a base stream according to the first encoding format having a reduced bandwidth and one or more enhancement layers according to the second encoding format. At 76, the WLC 20 tunnels the wireless-friendly SVC-encoded multicast video streams to the APs in one or more IP tunnels.

Figure 6:
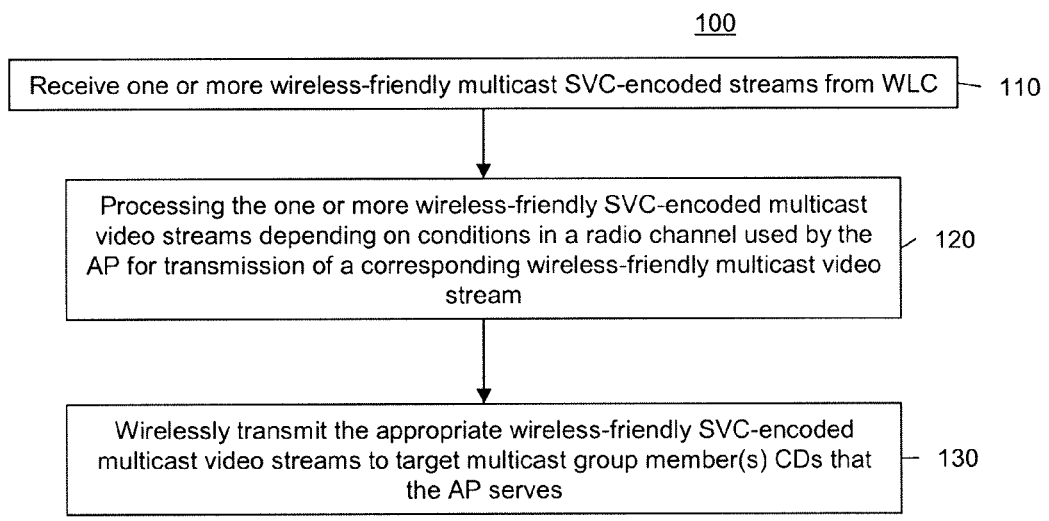
FIG. 6 is an example of a flow chart depicting operations at the access point device.

Turning now to FIG. 6, a high level description of the operations performed by the AP video gateway logic 100 in an AP is described. At 110, the AP receives one or more wireless-friendly multicast SVC-encoded video streams from the WLC 20. At 120, the AP processes the one or more wireless-friendly SVC-encoded multicast video streams depending on conditions in a radio channel used by the AP for transmission of a wireless-friendly multicast video stream. The processing operation at 120 may involve making no changes to a given wireless-friendly SVC-encoded multicast video streams or may involve any one of the processing or additional operations described hereinafter in connections with FIGS. 7-10.

At 130, in general, for a given wireless-friendly SVC-encoded video stream intended for a target multicast group of CDs, the AP multicasts the same wireless-friendly SVC-encoded video streams (addressed to a multicast IP group address) to all the CDs which are in that multicast group that the AP serves regardless of the different decoding capabilities of the CDs. SVC-capable CDs can decode the AVC-encoded base stream and the enhancement layers and can use FEC to recover lost frames. SVC-unaware clients can only decode the AVC-encoded base stream.

Figure 7:
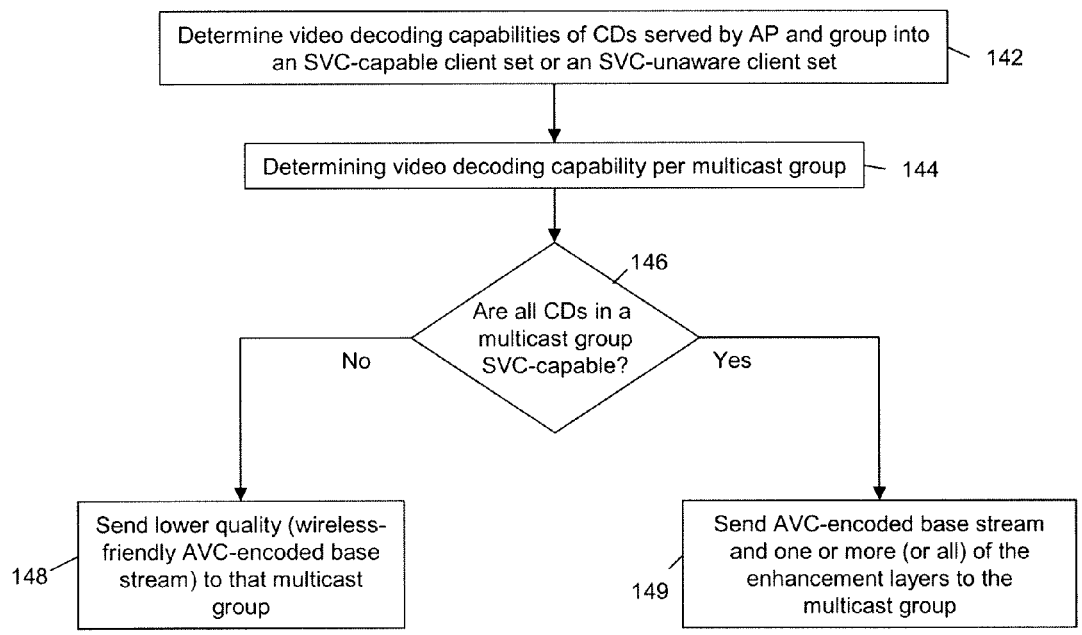
FIG. 7 is an example of a flow chart depicting additional processing operations at the access point device.

Reference is now made to FIG. 7 for a description of a first additional processing operation that may be executed by the AP at 120 in FIG. 6. At 142, the AP determines the video decoding capabilities of CDs that it serves and groups CDs into either an SVC-capable client set or an SVC-unaware client set. A CD may indicate that is SVC-capable by a vendor-specific or customized message contained in an extension to a wireless signaling protocol, e.g., a signaling scheme extension to the IEEE 802.11 communication protocol. In another form, the WLC 20 may "snoop" higher layer signaling, such as Session Initiation Protocol (SIP) packets, to determine whether a CD is SVC-capable, and relays this information to the appropriate AP.

Further still, the AP may use a Service Set Identifier (SSID) to identify a set of SVC-capable CDs. SVC SSIDs can be used to avoid making changes to a CD to enable the AP to determine whether the CD is SVC-capable or SVC-unaware. All 802.11 CDs are currently grouped into service sets. Each 802.11 client includes its SSID in messages it sends to its parent AP (e.g., in Association Request messages). A network administrator can assign an "SVC SSID" to a set of CDs that support SVC so that the AP can automatically recognize a CD as being SVC-aware or SVC-unaware by recognizing a particular SSID in messages received from CDs as being indicative of decoding capabilities of a CDs based on a priori SSID assignment.

At 144, the AP determines the video decoding capabilities for CDs in each multicast group (that is the target of a multicast video stream) based on the determinations made at 142 and thus can classify each multicast group as SVC-aware of SVC-unaware. At 146, the AP determines whether all CDs in a multicast group are SVC-capable. If not, then at 148, the AP wirelessly transmits only the wireless-friendly AVC-encoded base stream to that multicast group. On the other hand, when all CDs in a multicast group are SVC-capable, then at 149, the AP wirelessly transmits the AVC-encoded base stream and one or more (or all) of the enhancement layers to that multicast group. According to a further variation, the WLC 20 or APs may be configured to prohibit SVC-unaware CDs from joining a multicast group so that the AP can always transmit the higher quality enhancement layers to that multicast group.

The technique depicted in FIG. 7 alleviates the problem of current multicast implementations in which an AP reduces the transmission rate of all multicast frames to match the lowest rate of any client in the AP's Basic Service Set (BSS). In that case, a single low capability CD can reduce multicast performance even if that CD is not in any multicast group. By monitoring the current transmission rate of each CD, in each multicast group, the AP can determine the best radio physical (PHY) rate for each multicast group. For example, the AP can transmit multicast frames to a multicast group at a relatively high rate if all CDs in the group have a high transmission rate, as depicted in FIG. 7.

Figure 8:
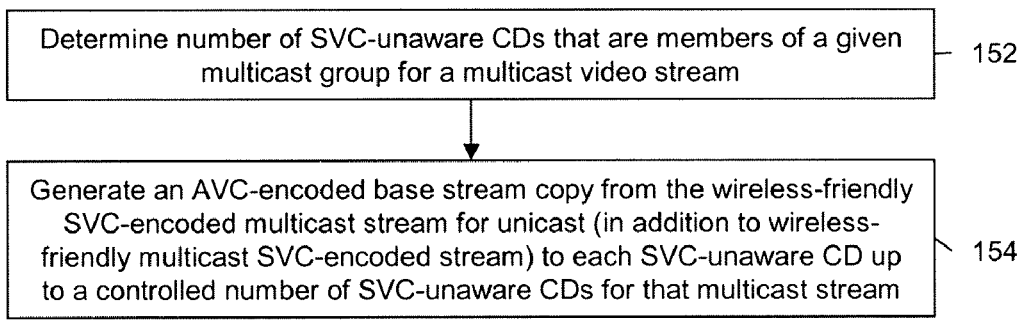
FIG. 8 is an example of a flow chart depicting still additional processing operations at the access point device.

Turning now to FIG. 8, yet another additional and optional processing operation 150 is described that may be performed at 120 shown in FIG. 6. At 152, the AP determines the number of SVC-unaware CDs that are members of a multicast group for a given multicast video stream. At 154, the AP generates an AVC-encoded base stream copy from the wireless-friendly SVC-encoded multicast stream received from the WLC 20 and sends it unicast (in addition to wireless-friendly multicast SVC-encoded stream) to each SVC-unaware CD up to a controlled number of "admitted" SVC-unaware CDs that are in the multicast group for that multicast stream. This separate AVC-encoded base stream that is sent unicast to a SVC-unaware CD is shown at S1*bs* in FIG. 4. The multicast-to-unicast conversion copy can improve the video quality for a controlled number of SVC-unaware CDs. The number of SVC-unaware CDs that the AP can unicast the separate AVC-encoded base stream depends on available bandwidth, etc., at any given time. The unicast video stream comprising only the wireless-friendly AVC-encoded base stream for a wireless-friendly multicast video stream is transmitted to one or more CDs determined not to have the more flexible SVC decoding capability.

Figure 9:
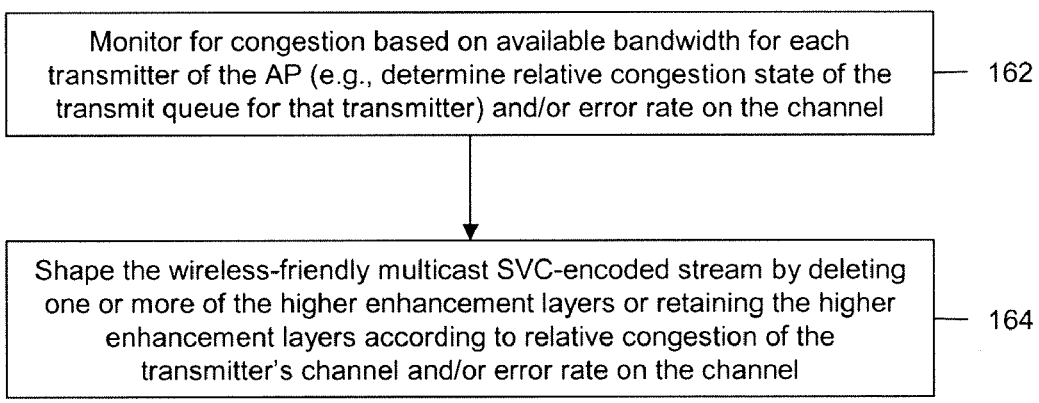
FIG. 9 is an example of a flow chart depicting yet additional processing operations at the access point device.
Figure 10:
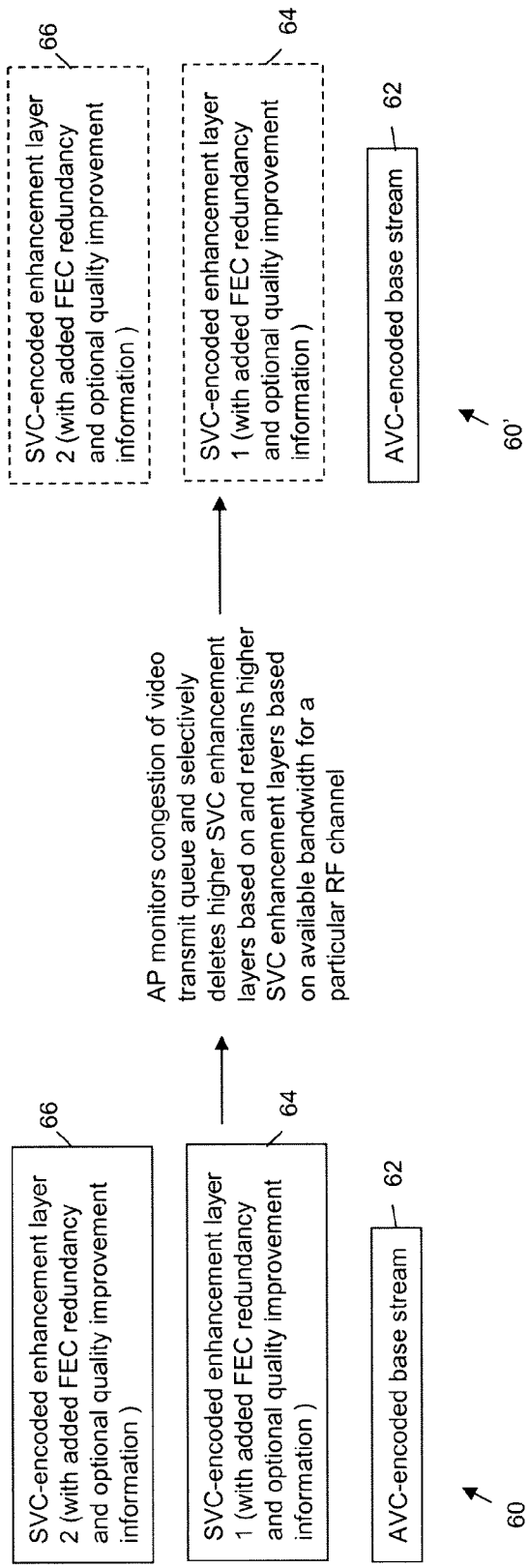
FIG. 10 is a diagram depicting an example of the processing operations depicted by the flow chart shown in FIG. 9.

With reference to FIGS. 9 and 10, still another optional operation 160 is now described that the AP may perform at 120 in FIG. 6. The operation 160 involves the AP monitoring the available bandwidth of each of the AP's transmitters, in real-time, and shaping the wireless-friendly multicast SVC-encoded video streams in software to match the available radio bandwidth. Specifically, at 162, the AP monitors for congestion on the radio channel used by each of its transmitters 38(1)-38(K) shown in FIG. 3 for transmission of a wireless-friendly multicast video stream based on available bandwidth on that radio channel. For example, the AP may examine the state of the transmit queue for traffic sent by each transmitter to determine the relative congestion on that channel. A relatively large transmit queue is indicative of relatively high congestion on that channel. In addition, at 162, based on unicast transmissions that the AP sends to CDs (separate from the multicast transmissions), based on retransmission requests for lost unicast messages, etc., the AP will have information indicating the error rate for the radio channel to one or more CDs in a multicast group that is the target of a wireless-friendly multicast video stream. The AP uses the error rate for unicast frames as an estimate for the error rate for multicast frames on the same radio channel. At 164, the AP "shapes" the wireless-friendly multicast SVC-encoded video stream by deleting one or more of the higher enhancement layers or retaining the higher enhancement layers according to the relative congestion of that channel. For example, the AP deletes higher "enhancement layers" from a wireless-friendly SVC-encoded multicast stream that is to be sent over a particular transmitter of the AP when that transmitter's video transmit queue is congested; conversely, the AP retains one or more of the higher SVC enhancement layers when the target transmitter's video transmit queue is uncongested to achieve better quality or resolution at the CD with the additional video information contained in the one or more enhancement layers. Likewise, at 164, the AP can also shape multicast streams by retaining or deleting one or more enhancement layers that include the redundancy information for forward error correction based on the error rate of the radio channel. For example, the AP can include SVC enhancement layers, which contain redundant information used for forward error correction, when the channel error rate is high, or conversely delete one or more enhancement layers that include the redundancy information used for forward error correction when it is determined that the error rate on the radio channel is relatively low. As shown in FIG. 10, the AP outputs modified video frames shown at 60' with or without the enhancement layers as described above.

In general, the AP shapes the multicast video streams for any one or more of the following reasons. The quality of multicast video streams can be enhanced when more radio bandwidth is available. The maximum number of concurrent multicast video streams can be increased when more radio bandwidth is available. Previously-admitted video streams can be retained when radio bandwidth is sporadically reduced. Previously-admitted video streams can be retained when clients roam to new APs with less available bandwidth.

Multicast frames can be lost due to bit errors and collisions. A Clear-to-Send (CTS)-to-self mechanism can be used to reduce collisions. The CTS-to-self mechanism clears the medium/channel to reduce collisions that can cause packet loss. The combination of a CTS-to-self mechanism and SVC-based forward error correction can be used to implement very robust multicast video streaming on 802.11 links.

The wireless multicast video streaming techniques described herein achieve substantial improvement over existing wireless multicast video streaming techniques. A single (wireless-friendly) SVC-encoded multicast video stream can be "multicasted" to a large group of IEEE 802.11 wireless clients. The FEC redundancy information in SVC enhancement layers allows client devices to recover lost multicast frames and avoid degraded video quality. A complicated multicast error recovery protocol is not needed. These techniques are backward-compatible with clients that do not support newer versions of the H.264 SVC standard. These techniques are also generally independent of the IEEE 802.11 communication protocol and do not require any changes to the current 802.11 standards. Moreover, these techniques can easily be adapted to non-802.11 wireless communication protocols.

In sum, the distributed wireless gateway platform comprises a central hardware-based video transcoder that is configured to resize relatively high-bandwidth multicast video streams to match inherent bandwidth limitations of a WLAN. The hardware-based multicast video transcoding is contained within the central transcoder so that the APs do not need hardware-based video coder/decoders (codecs). The APs can shape wireless-friendly SVC-encoded video streams in software based on the real-time state of an AP's radio transmitter. The distributed shaping method does not require a "chatty" radio feedback protocol between the APs and a central controller. Furthermore, APs can adapt the multicast video transmission (encoding) rates adapted to the current decoding capabilities of clients in multicast groups.

The above description is by way of example only.

What is claimed is:
1. A method comprising:
at a central apparatus configured to communicate with one or more access point devices operating in a wireless local area network:
receiving one or more multicast video streams each intended for a multicast group of wireless client devices served by one or more of the access point devices;
re-encoding the one or more multicast video streams to produce a corresponding one or more wireless-friendly multicast video streams that have a reduced bandwidth from a bandwidth of the received multicast video streams, the one or more wireless-friendly multicast video streams for wireless transmission by access point devices to wireless client devices in the wireless local area network; and sending the one or more wireless-friendly multicast video streams to the one or more access point devices;
at the one or more access point devices that receive the one or more wireless-friendly multicast video streams:
processing the one or more wireless-friendly multicast video streams depending on conditions in a radio channel used by the access point device; and
wirelessly transmitting over the radio channel the one or more wireless-friendly multicast video streams to one or more client devices in a corresponding multicast group.

2. The method of claim 1, wherein receiving at the central apparatus comprises receiving multicast video streams according to a first encoding format or according to a second encoding format, wherein the second encoding format comprises a base stream that is encoded in a format that is compatible with the first encoding format and one or more enhancement layers, and wherein re-encoding comprises re-encoding the multicast video stream according to either the first encoding format or the second encoding format into the wireless-friendly multicast video stream comprising a base stream according to the first encoding format having the reduced bandwidth and one or more enhancement layers according to the second encoding format that incrementally add quality to the video stream and also comprise additional redundancy information not otherwise included in the multicast video stream prior to re-encoding to allow for forward error correction by wireless client devices to recover lost frames.

3. The method of claim 2, at the one or more access point devices, further comprising monitoring for congestion a radio channel used for wirelessly transmitting the wireless-friendly multicast video stream, and further comprising deleting one or more enhancement layers or retaining one or more of enhancement layers of the wireless-friendly multicast video stream according to the congestion determined on the radio channel used for that wireless-friendly multicast video stream.

4. The method of claim 2, at the one or more access point devices, further comprising monitoring error rate on a radio channel used for wirelessly transmitting a wireless-friendly multicast video stream, and further comprising retaining or deleting from the multicast video stream one or more enhancement layers that include the redundancy information for forward error correction by a wireless client device based on the error rate determined for the radio channel.

5. The method of claim 2, wherein wirelessly transmitting comprises wirelessly transmitting the same wireless-friendly multicast video stream to wireless client devices that are members of the corresponding multicast group regardless of different decoding capabilities of the wireless client devices.

6. The method of claim 2, and further comprising, at the one or more access point devices, determining decoding capabilities for wireless client devices within a multicast group.

7. The method of claim 6, and further comprising, at the one or more access point devices, when all wireless client devices in a multicast group are determined to have a scalable video decoding capability, wirelessly transmitting comprises wirelessly transmitting the wireless-friendly multicast video stream comprising the base stream and one or more of the enhancement layers, and when at least one wireless client device in the multicast group is determined not to have the scalable decoding capability, wirelessly transmitting comprises wirelessly transmitting the wireless-friendly multicast video stream comprising only the base stream.

8. The method of claim 6, at the one or more access point devices, further comprising generating a unicast video stream comprising only the base stream for a wireless-friendly multicast video stream for transmission to one or more wireless client devices determined not to have a scalable video decoding capability in addition to the wireless-friendly multicast video stream.

9. The method of claim 6, wherein determining decoding capabilities of the wireless client devices comprises one or more of: recognizing a customized message contained in an extension to a wireless signaling protocol, monitoring higher layer signaling from wireless client devices, and recognizing a particular service set identifier in messages received from wireless client devices as being indicative of decoding capabilities of a wireless client device based on a priori service set identifier assignment.

10. The method of claim 2, wherein the first encoding format is an Advanced Video Compression (AVC) encoding format and the second encoding format is a Scalable Video Coding (SVC) encoding format, and wherein the enhancement layers of a wireless-friendly multicast video stream produced from a received SVC-encoded multicast video stream comprise SVC-enhancement layers.

11. The method of claim 1, wherein sending the one or more wireless-friendly multicast video streams to the one or more access point devices comprises encapsulating data for one or more frames of a wireless-friendly multicast video stream with an outer Internet Protocol (IP) header having a group address and sending the wireless-friendly multicast video stream in one or more IP tunnels to the one or more access point devices.

12. An apparatus comprising:
at least one transmitter configured to transmit wireless signals; and
a network interface unit configured to enable communications over a wired network;
a processor configured to be coupled to the at least one transmitter, wherein the processor is configured to:
receive from the network interface a wireless-friendly multicast video stream that has a reduced bandwidth for wireless transmission;
process the wireless-friendly multicast video stream depending on conditions in a radio channel used by the transmitter to transmit signals to wireless client devices; and
supply the wireless-friendly multicast video stream to the transmitter to transmit the wireless-friendly multicast video streams over the radio channel to one or more client devices that are in a multicast group intended for the wireless-friendly multicast video stream.

13. The apparatus of claim 12, wherein the processor is configured to receive the wireless-friendly multicast video stream comprising a base stream according to a first encoding format and one or more enhancement layers according to a second encoding format, and wherein the processor is further configured to monitor for congestion on the radio channel, and to delete one or more enhancement layers or retain one or more of enhancement layers of the wireless-friendly multicast video stream according to the congestion determined on the radio channel.

14. The apparatus of claim 13, wherein the processor is configured to supply the same wireless-friendly multicast video stream to the transmitter for transmission to wireless client devices that are members of the multicast group regardless of different decoding capabilities of the wireless client devices.

15. The apparatus of claim 12, wherein the processor is further configured to determine decoding capabilities for wireless client devices in the multicast group.

16. The apparatus of claim 15, wherein the processor is further configured to, when all wireless client devices in the multicast group are determined to have a scalable video decoding capability, supply the wireless-friendly multicast video stream comprising a base stream and one or more of enhancement layers to the transmitter for transmission to the wireless client devices in the multicast group, and when at least one wireless client device in the multicast group is determined not to have the scalable video decoding capability, supply the wireless-friendly multicast video stream comprising only the base stream to the transmitter for transmission to the wireless client devices in the multicast group.

17. The apparatus of claim 16, wherein the processor is configured to generate a unicast video stream comprising only the base stream for the wireless-friendly multicast video stream for transmission to one or more wireless client devices determined not to have the scalable video decoding capability in addition to the wireless-friendly multicast video stream.

18. A non-transitory computer readable medium storing instructions that, when executed by a processor, cause the processor to:
receive a wireless-friendly multicast video stream that has a reduced bandwidth for wireless transmission;
process the wireless-friendly multicast video stream depending on conditions in a radio channel used by a transmitter to transmit signals to wireless client devices; and
supply the wireless-friendly multicast video stream to the transmitter to transmit the wireless-friendly multicast video streams over the radio channel to one or more client devices that are in a multicast group intended for the wireless-friendly multicast video stream.

19. The non-transitory computer readable medium of claim 18, wherein instructions that, when executed by the processor, cause the processor to receive the wireless-friendly multicast video stream comprise instructions that cause the processor to receive the wireless-friendly multicast video stream comprising a base stream according to a first encoding format and one or more enhancement layers according to a second encoding format, and further comprising instructions that, when executed by the processor, cause the processor to monitor the radio channel for congestion, and to delete one or more enhancement layers or retain one or more of enhancement layers of the wireless-friendly multicast video stream according to the congestion determined on the radio channel.

20. The non-transitory computer readable medium of claim 19, and further comprising instructions that, when executed by the processor cause the processor to determine decoding capabilities for wireless client devices in the multicast group.

21. The non-transitory computer readable medium of claim 19, and further comprising instructions that, when executed by the processor cause the processor to, when all wireless client devices in the multicast group are determined to have a scalable video decoding capability, supply the wireless-friendly multicast video stream comprising the base stream and one or more of the enhancement layers for transmission to the wireless client devices in the multicast group, and when at least one wireless client device in the multicast group is determined not to have the scalable video decoding capability, to supply the wireless-friendly multicast video stream comprising only the base stream for transmission to the wireless client devices in the multicast group.

22. The non-transitory computer readable medium of claim 19, and further comprising instructions that, when executed by the processor cause the processor to, generate a unicast video stream comprising only the base stream for the wireless-friendly multicast video stream for transmission to one or more wireless client devices determined not to have a scalable decoding capability in addition to the wireless-friendly multicast video stream.

23. A method comprising:
at a central apparatus configured to communicate with one or more access point devices operating in a wireless local area network, receiving one or more multicast video streams according to a first encoding format or a second encoding format, each multicast video stream intended for a multicast group of wireless client devices served by one or more of the access point devices, wherein the second encoding format comprises a base stream that is encoded in a format that is compatible with the first encoding format and one or more enhancement layers;
re-encoding the one or more multicast video streams according to either the first encoding format or the second encoding format into one or more wireless-friendly multicast video streams that have a reduced bandwidth from a bandwidth of the received multicast video streams comprising a base stream according to the first encoding format having the reduced bandwidth and one or more enhancement layers according to the second encoding format that incrementally add quality to the video stream and also comprise additional redundancy information not otherwise included in the multicast video stream prior to re-encoding to allow for forward error correction by wireless client devices to recover lost frames; and
sending the one or more wireless-friendly multicast video streams to the one or more access point devices.

24. The method of claim 23, wherein sending the one or more wireless-friendly multicast video streams to the one or more access point devices comprises encapsulating data for one or more frames of a wireless-friendly multicast video stream with an outer Internet Protocol (IP) header having a group address and sending the wireless-friendly multicast video stream in one or more IP tunnels to the one or more access point devices.

* * * * *